(12) United States Patent
Meinke

(10) Patent No.: US 11,321,815 B2
(45) Date of Patent: May 3, 2022

(54) METHOD FOR GENERATING DIGITAL IMAGE PAIRS AS TRAINING DATA FOR NEURAL NETWORKS

(71) Applicant: Robert Bosch GmbH, Stuttgart (DE)

(72) Inventor: Martin Meinke, Hildrizhausen (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 16/857,032

(22) Filed: Apr. 23, 2020

(65) Prior Publication Data
US 2020/0342574 A1 Oct. 29, 2020

(30) Foreign Application Priority Data

Apr. 25, 2019 (DE) ..................... 10 2019 205 962.7

(51) Int. Cl.
| | | |
|---|---|---|
| *G06T 5/00* | (2006.01) | |
| *G06N 3/08* | (2006.01) | |
| *G06T 7/20* | (2017.01) | |
| *G01S 17/89* | (2020.01) | |

(52) U.S. Cl.
CPC .............. *G06T 5/002* (2013.01); *G01S 17/89* (2013.01); *G06N 3/08* (2013.01); *G06T 7/20* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 10,832,093 B1 * | 11/2020 | Taralova | G06K 9/6215 |
| 2019/0045114 A1 | 2/2019 | Ishibashi | |
| 2020/0234080 A1 * | 7/2020 | Ciller Ruiz | G06T 11/008 |

OTHER PUBLICATIONS

Ignatov, Andrey et al., DSLR-Quality Photos on Mobile Devices with Deep Convolutional Networks, Proceedings of the IEEE International Conference on Computer Vision (ICCV), 2017, pp. 3277-3285 (Open access version, provided by the Computer Vision Foundation) (9 pages).

* cited by examiner

*Primary Examiner* — Leon Flores
(74) *Attorney, Agent, or Firm* — Maginot, Moore & Beck LLP

(57) ABSTRACT

A method for generating a digital image pair for training a neural network to correct noisy image components of noisy images includes determining an extent of object movements within an overlapping region of a stored first digital image and a stored second digital image of an environment of a mobile platform, and determining a respective acquired solid angle of the environment of the mobile platform of the first and second digital images. The method further includes generating the digital image pair from the first digital image and the second digital images, when the respective acquired solid angles of the environment of the first and the second digital image do not differ from one another by more than a defined difference, and the extent of the object movements within the overlapping region of the first and the second digital image is less than a defined value.

13 Claims, 2 Drawing Sheets

METHOD FOR GENERATING DIGITAL IMAGE PAIRS AS TRAINING DATA FOR NEURAL NETWORKS

This application claims priority under 35 U.S.C. § 119 to patent application no. DE 10 2019 205 962.7, filed on Apr. 25, 2019 in Germany, the disclosure of which is incorporated herein by reference in its entirety.

The disclosure relates to a method for generating digital image pairs as training data for neural networks, which learn to reconstruct noisy images by means of noisy images.

BACKGROUND

When generating environmental representations for automated driving by means of, for example, imaging sensors, the result can be negatively influenced by a variety of effects. In addition to classic measurement noise, which results from the random nature of the measurement method and its detector design of imaging sensors, diverse environmental influences, for example, direct sunlight, rain, snow, or fog cause influencing of the measurement result. These influencing factors result in many false detections (false positives) or the complete absence of detections (false negatives). The performance of downstream algorithms accordingly decreases.

If the result is worsened because of such influencing factors in the imaging methods used, such data possibly has to be detected and corrected or discarded.

Methods which can recognize or remove these incorrect measurements therefore result in improvements of an environmental representation, especially in the field of automated driving.

SUMMARY

The disclosure discloses a method for creating digital image pairs for training neural networks in order to correct noisy image components of noisy images, a corresponding method for training a neural network, a corresponding method for correcting noisy image components of noisy images, a method for representing an environment of an at least partially automated mobile platform, a device, a computer program product, and a machine-readable storage medium.

Convolutional neural networks can be used for noise suppression. "Clean" training data, i.e., images which are not—or are only slightly—noisy are used to train such a network. Such training data are unfortunately in reality frequently not accessible or only accessible in a very difficult and costly manner.

If the noise distribution in the images relates to a statistical mean value or median of the affected pixels, thus if the pixel values of many images noisy independently of one another correspond on average and/or in the median to the noise-free image, successful removal of noise components in digital images is possible even without ground-truth annotated training image data. However, correspondingly suitable image pairs are required for this purpose.

The method according to the disclosure creates a digital image pair for training a neural network, wherein the neural network corrects noisy image components of noisy images.

In this case, in one step an extent is determined of object movements within an overlapping region of a stored first digital image and a stored second digital image of an environment of a mobile platform. In a further step, a respective acquired solid angle of the environment of the mobile platform, of the first and second digital image is determined. In a further step, the digital image pair is generated from the first digital image and the second digital image, if the respective acquired solid angles of the environment of the first and the second digital image do not deviate from one another by more than a defined difference and the extent of the object movements within the overlapping region of the first and the second digital image is less than a defined value.

A neural network provides a framework for many different algorithms for machine learning, for cooperation, and for processing complex data inputs. Such neural networks learn to execute tasks on the basis of examples, without typically having been programmed with task-specific rules.

Such a neural network is based on a collection of connected units or nodes, which are referred to as artificial neurons. Every connection can transmit a signal from one artificial neuron to another. An artificial neuron which receives a signal can process it and then activate further artificial neurons connected thereto.

In conventional implementations of neural networks, the signal at a connection of artificial neurons is a real number, and the output of an artificial neuron is computed by a nonlinear function of the total of its inputs. The connections of the artificial neurons typically have a weight, which adapts with progressing learning. The weight increases or decreases the strength of the signal at a connection. Artificial neurons can have a threshold, so that a signal is only output if the total signal exceeds this threshold. A plurality of artificial neurons is typically compiled into layers. Different layers possibly carry out different types of transformations for the inputs thereof. Signals travel from the first layer, the input layer, to the last layer, the output layer, possibly after passing through the layers multiple times.

The architecture of such an artificial neural network can be a neural network which is constructed in accordance with a multilayer perceptron (MLP) network. A multilayer perceptron (MLP) network belongs to the family of artificial feed-forward neural networks. In principle, MLPs consist of at least three layers of neurons: an input layer, an intermediate layer (hidden layer), and an output layer. This means that all neurons of the network are classified into layers, wherein one neuron of a layer is always connected to all neurons of the next layer. There are no connections to the prior layer and no connections which jump over a layer. Except for the input layer, the different layers consist of neurons which are subject to a nonlinear activation function and are connected to the neurons of the next layer. A deep neural network can comprise many such intermediate layers.

Processing of images can be performed using neural encoder-decoder networks, which are refined similarly to the above-mentioned neural networks. The architecture of such neural encoder-decoder networks typically consists of two parts. The first part corresponds to an auto encoder and is a sequence of layers which downsample the input pattern into a lower resolution with respect to a data set in order to obtain the desired items of information and reduce redundant items of information. The second part is a sequence of layers which upsample the output of the first part and restore the desired output resolution, for example, the input resolution. There can optionally be additional skip connections which directly connect some layers in the first part and in the second part.

Such encoder-decoder networks have to be trained for the specific task thereof. In this case, each neuron of the corresponding architecture of the neural network receives, for example, a random starting weight. The input data are then put into the network and each neuron weights the input signals with its weight and relays the result to the neurons of the next layer. The overall result is then provided at the output layer. The size of the error can be computed, and the proportion which every neuron had of this error, and then the weight of each neuron can change in the direction which minimizes the error. Recursive passes, renewed measurements of the error, and adaptation of the weights until the error is less than a predetermined limit then take place.

Digital images can be negatively influenced by a variety of effects with respect to a usage of the images. In addition to classic measurement noise, which is caused by the random nature of the measurement method and its detector design, images of an environment of a mobile platform can also be influenced by environmental effects. In particular fog, snow, and rain obviously have a large influence on the quality of the images, but also reflections or direct sunlight can negatively affect the quality of images. This applies similarly to digital images in the optical field, to RADAR (radio detection and ranging) images, to LIDAR (light detection and ranging) images, or other imaging methods, to different extents.

For example, in the case of images which are generated by a LIDAR measurement method, these influencing factors result in false detections (false positives) or the complete absence of detections (false negatives). The performance of downstream analysis algorithms decreases as a result thereof.

Let us now consider, for example, the range measurement of a LIDAR sensor. In good environmental conditions (no weather influences or strong background light), false-positive or false-negative measurements hardly occur.

In the case of negatively affecting conditions due to the environment, however, both phenomena increasingly occur. For example, the emitted laser pulse of the LIDAR scanner is reflected by raindrops or snowflakes before it reaches the object to be measured. The measured distance is less than the real distance to the object to be measured. A detection also occurs before the reflected measurement pulse is incident on the LIDAR detector due to a high level of background light (for example, direct sunlight). The measured distance is then less than a real distance to the measured object. If the emitted laser pulse is deflected from its path, for example, by water drops, the reflected signal sometimes does not arrive at the detector and the measurement is invalid and/or the object is outside the sensor range.

In the LIDAR image, the noise distribution of measurements ("images") recorded in chronological succession can therefore be assumed to be independent of one another. A distance measurement in a specific solid angle then does not give a statistically significant statement about a result of a following measurement. Knowledge about the noise distribution of one image thus does not permit inferences about the noise distribution of the other. Therefore, the conditions for the applicability of the above-described method are provided in the case of the LIDAR measuring method and images resulting therefrom.

In order that the generated image pairs are suitable for the above-described method, it has to be ensured that the scene is only overlaid with noise of the abovementioned noise sources, and additional changes in the image do not result, for example, due to a change of the scene.

This means that in addition to the requirements for the noise, on the one hand, only scenes are analyzed, the image contents of which overlap, and additionally that in the time range in which the image pair was generated, a change of imaged objects because of a movement is less than a defined value in its extent. By means of an inertial navigation system, which is available for the mobile platform, it can possibly be ensured that the locations of the two images which come into consideration for such an image pair do not differ from one another by more than a predefined value. For example, however, other imaging methods which are applied simultaneously can also be used to ensure the overlap of the two images. In addition, sensor data, for example, radar data, can be used to determine the extent of movement of objects in this scene and to ensure by means of a comparison that such a movement has remained below a defined limit. In particular, a displacement of the image data in the overlap region is not to exceed a few pixels, i.e., this displacement, defined more accurately, is to be less than 5 pixels.

For the suitability of a digital image pair for such training of a neural network, it additionally has to be ensured that the image is recorded from a very similar perspective. This may be ensured in that the respective acquired solid angles of the environment of the first and the second digital image do not differ from one another by more than a defined difference. In this case, a solid angle describes the component of the entire space which is located, for example, in the interior of a given cone surface or pyramid surface.

This can be ensured in particular in that the viewpoints from which the images were recorded do not differ from one another by more than a defined value. This can be ensured by a variety of different methods, for example, by measuring distances using a radar system, by triangulation, by position-determining systems, for example, GPS (global positioning system), or by measured values from inertial navigation systems, which are connected to the mobile platform on which such an imaging system can be installed. Optionally, further environmental sensors, for example, radar systems or cameras, and tracking algorithms are also used coupled to one another to establish whether other moving road users are located in the scene, which have changed the position thereof and thus the scene to an impermissible extent between the recording of the two images. This also applies correspondingly to a simultaneous recording using two imaging systems, which are related to one another so that only a permissible change of a solid angle of the images thus connected results. A permissible displacement of the recording viewpoint due to movement of the mobile platform and/or displacement between two respective imaging systems is typically in the range of several centimeters, in particular such a displacement is to be less than 15 cm.

A mobile platform can be understood as an at least partially automated system, which is mobile, and/or a driver assistance system. An example can be an at least partially automated vehicle and/or a vehicle having a driver assistance system. This means that in this context, an at least partially automated system includes a mobile platform with respect to an at least partially automated functionality, but a mobile platform also includes vehicles and other mobile machines including driver assistance systems. Further examples of mobile platforms can be driver assistance systems having multiple sensors, mobile multisensor robots, for example, robot vacuum cleaners or lawnmowers, a multisensor monitoring system, a manufacturing machine, a personal assistant, or an access control system. Each of these systems can be a completely or partially automated system.

If, for example, a sequence of 20 recordings meets the abovementioned requirements, 20 over 2, in accordance with the binomial coefficient, different image pairs may be generated therefrom as training data for a neural network. Since such a method for obtaining training data does not require any manual annotation, large amounts of data, for example, from a vehicle fleet, may be obtained very easily and applied to training of a neural network.

According to one design of the disclosure, it is proposed that the extent of the object movements within the overlapping region of the first and the second digital image be determined using data of an inertial navigation system of the mobile platform. An inertial navigation system integrates measurement data of multiple sensors attached to the mobile platform in order to improve the quality of the object detection and object tracking.

By analyzing a variety of images which appear to be suitable as image pairs to train a neural network accordingly and for each of which the data of an inertial navigation system are available, depending on the scope and complexity of the data of the tracking system, an extent of the object movements within the overlapping region of the two images may be determined very easily, for example, by the viewpoint and the alignment of a system which has recorded the corresponding images being compared to one another. Additional sensors which are associated with the tracking system can also be used for determining the extent of the object movements.

According to one design of the disclosure, it is proposed that the determination of the respective acquired solid angle of the environment of the mobile platform, of the first and second digital image, be determined using data of an inertial navigation system of the mobile platform. The inertial navigation system can be used for this purpose in the same manner as was described in the case of the analysis for the extent of object movements within the overlapping region.

According to one design of the disclosure, it is proposed that the extent of the object movement be ascertained by means of a signal of a radar system or radar sensor or an image analysis of an optical system or a tracking system.

As described above, a radar system or a radar sensor is suitable in particular for detecting object movements, since a radar signal can directly indicate movements and velocities in its detection range.

According to one design of the disclosure, it is proposed that a difference of the respective acquired solid angle of the environment of the mobile platform, of the first and second digital image, be determined using data of an inertial navigation system of the mobile platform. In particular via data of an inertial navigation system, which can possibly identify by means of an inertial effect that no movement of the imaging system occurred between the first and the second image, inferences can be drawn both with respect to an overlap of the image regions and also with respect to an acquired solid angle.

According to one design of the disclosure, it is proposed that the stored first and second digital image be generated by a transformation of signals of a LIDAR system.

The signals of a LIDAR system, which scans, for example, the environment of a mobile platform by means of laser beams, can be converted into a two-dimensional image by means of a transformation and then can be used for training a neural network to correct noisy image components of images thus generated. As stated above, LIDAR systems would also be subject to errors, in particular due to environmental influences, which can be used by the application of such a neural network to the images of such a system for a further use, for example, for a decision system for an automated vehicle.

According to one design of the disclosure, it is proposed that the stored first and second digital image be acquired by means of image-generating systems of a variety of at least partially automated mobile platforms. For rapidly generating suitable image pairs for training a neural network for correcting noisy images, the image pairs of a variety of at least partially automated mobile platforms, which are equipped with the respective imaging system, can be recorded and then centrally analyzed to train a neural network in the described manner.

A method for training a neural network to correct noisy image components of noisy images is proposed, wherein the image pairs were generated according to the above-described method for generating digital image pairs and the neural network is trained, using the first digital image of the digital image pair as an input variable, to generate the second digital image of the digital image pair.

The above-described method for generating suitable digital image pairs can be used to train a neural network by a first image of the image pair being used as an input variable for the neural network and the second image of the image pair being predefined as a target variable for the neural network. In this case, the neural network, which comprises, for example, an architecture as described above, learns to filter out precisely the noise of noisy images by correcting noisy image components.

A method is proposed for correcting noisy image components of noisy images by means of a neural network, which was trained according to the method for training a neural network. In this case, a noisy image is transferred as an input variable to a trained neural network and the noisy image components are then corrected in the image generated by the neural network.

Using this method for correcting noisy image components, the images, which are generated by different imaging methods and are possibly noisy, are better suited to be used for a further use in conjunction with automated systems in order, for example, to be analyzed for a recognition of an environment of a mobile platform or resulting action, which is triggered by a downstream decision system.

A method is specified for representing an environment of an at least partially automated mobile platform by means of images, which were acquired by image-generating systems from the environment of the at least partially automated mobile platform and the noisy image components of which are corrected according to a method for correcting noisy image components of noisy images.

Due to the correction of the noisy image components, the representation of the environment of the at least partially automated mobile platform can be used with a higher quality for a representation or for a further analysis, for example, a decision system, and can thus be used with a higher level of reliability with respect to actions which are derived from the representation of the environment.

According to one design of the method for representing an environment, the representation of the environment is used to activate an at least partially automated vehicle and/or a depiction of the representation of an environment is transmitted to a vehicle occupant. By means of such a representation of an environment, for example, actions of a mobile platform can be initiated or regulated, or a vehicle occupant can use the representation to derive items of information which can influence further behavior of the vehicle occupant.

A device is specified which is configured to carry out one of the above-described methods.

By means of such a device, it is possible to make the above-described methods available, for example, for installation in a mobile platform.

A computer program product is specified, which comprises commands which, upon the execution of the program by a computer, cause the computer to execute one of the above-described methods. By means of such a computer program product, the above-described methods can be made available in a simple manner, for example, to a mobile platform.

A machine-readable storage medium is specified, on which the above-described computer program is stored.

The above-described computer program product is transportable by means of such a machine-readable storage medium.

BRIEF DESCRIPTION OF THE DRAWINGS

Exemplary embodiments of the disclosure are described with reference to FIGS. 1A, 1B, 1C, 1D, and 2 and explained in greater detail hereafter. In the figures.

DETAILED DESCRIPTION

Figure 1A:
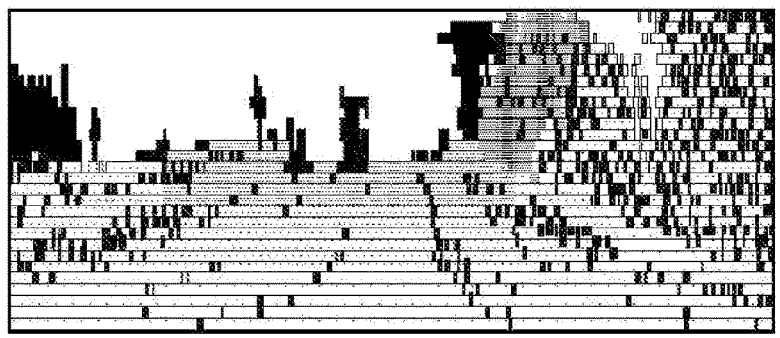
FIG. 1A shows a noise-free input image.

FIG. 1A schematically shows a noise-free exemplary input image. The image represents an image generated using a LIDAR system of an environment of a platform, in which a road extends into the depth of the image. An automobile has been detected in the depth of the image, a sidewalk extends along the right of the road, and vegetation has been detected further to the right thereof. A traffic sign projects in the distance on the left of the road. In this case, all images 1A, 1B, 1C, and 1D have been schematically converted from the original images by means of shading for this representation.

Figure 1B:
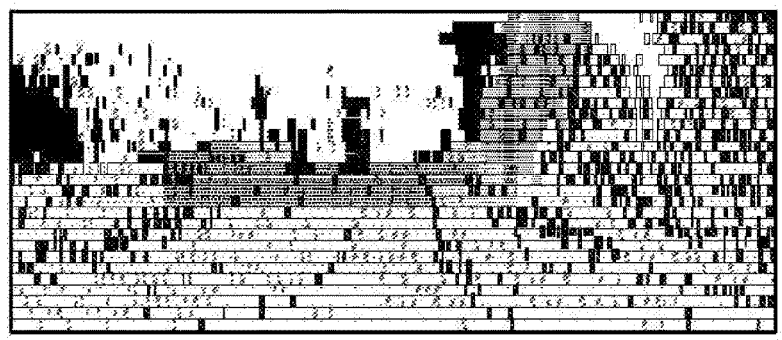
FIG. 1B shows the input image overlaid with a first synthetic noise.

In FIG. 1B, the input image shown in FIG. 1A has been overlaid with synthetic noise, wherein a noise value having a distance between 0 m and the measured distance was used for 25% of the pixels.

Figure 1C:
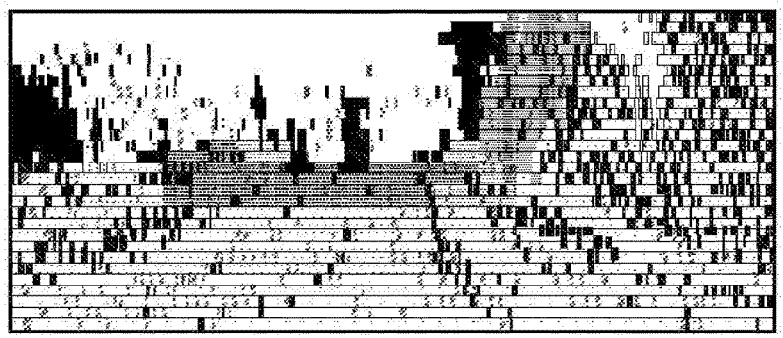
FIG. 1C shows the input image overlaid with a second synthetic noise.

FIG. 1C has been generated in accordance with FIG. 1B, wherein the noise was overlaid on the image of FIG. 1A independently of the noise of FIG. 1B, however.

Figure 1D:
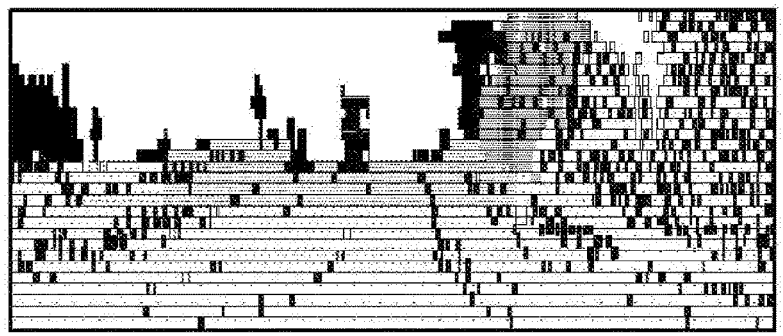
FIG. 1D shows an image having corrected image components of a noisy input image.

FIG. 1D shows the result of the neural network trained as described above using a variety of noisy image pairs, which has received the noisy image of FIG. 1B as an input variable.

Images of FIGS. 1B and 1C are thus examples of noisy image pairs for the training of a neural network. FIG. 1D shows how surprisingly well the neural network has learned to correct the noisy image components.

The exemplary neural network is an encoder-decoder network which is constructed from two parts. The first part is a sequence of layers which sample the input grids down to a lower resolution in order to obtain the desired items of information and store the redundant items of information. The second part is a sequence of layers which again sample the output of the first part in a completely connected layer and generate the desired output resolution, for example, a classification vector having the same length as the number of the signals characterizing hazardous situations to be classified.

The first part is an encoder which comprises, for example, three or more layers:

An input layer, for example, a two-dimensional image.

Multiple significantly smaller layers, which form the encoding for reducing the data.

An output layer, the dimension of which corresponds to that of the input layer, i.e., every output parameter in the output layer has the same meaning as the corresponding parameter in the input layer.

This encoder is designed in accordance with an artificial convolutional neural network and comprises one or more convolutional layers, which are possibly followed by pooling layers. The sequence of layers can be used with or without normalization layers (for example, batch normalization), zero padding layers, dropout layers, and activation functions, for example, rectified linear unit ReLU, sigmoid function, tan h function, or softmax function. These units can in principle repeat arbitrarily often; with sufficient repetitions, they are then referred to as deep convolutional neural networks.

In this case, the artificial convolutional neural network consists of an encoder-decoder architecture, which achieves the reduction of the data via multiple convolutions having stride 2. To scale back the compressed data representation, transposed convolution layers ("deconvolution") are used, as can be inferred from Table 1. Table 1 describes the layers of the encoder convolution network in greater detail. The input of the encoder convolution network is a 1800×32×1 image (distance measurement for every "pixel") and/or tensor data pattern.

TABLE 1

| Layer (type) | Output form |
| --- | --- |
| Input LIDAR distance image | (1800, 32, 1) |
| Conv2d 1 (3 × 3, zero padding) | (1800, 32, 32) |
| Conv2d 2 (3 × 3, zero padding) | (1800, 32, 64) |
| Conv2d 3 (3 × 3, stride = 2) | (900, 16, 96) |
| Conv2d 4 (3 × 3, stride = 2) | (450, 8, 96) |
| Conv2d 5 (3 × 3, stride = 2) | (225, 4, 96) |
| Conv2d_transposed 1 (3 × 3, stride = 2, zero padding) | (450, 8, 96) |
| Conv2d_transposed 2 (3 × 3, stride = 2, zero padding) | (900, 16, 64) |
| Conv2d_transposed 3 (3 × 3, stride = 2, zero padding) | (1800, 32, 32) |
| Conv2d 6 (3 × 3) | (1800, 32, 1) |

In the training, two different loss functions can be used for defining the parameters of the neural network. In the case of a LIDAR system, one can proceed from a noise distribution which can be described using a median. This means the median corresponds to infinitely many recorded images of a non-noisy image. For such noise, which can be described using a median, the error can be described using an L1 norm in which the variables of the error L1 are related to one another in a manner which can be described according to the following formula:

$$L1 = \frac{1}{n}\sum_{i=1}^{n}|\hat{y}^{(i)} - y^{(i)}| \quad (1)$$

In this case, L is the loss function having the running index i, which runs as the pixel index from 1 up to the length times the width of the image, and $\hat{y}$: is the prediction of the network, i.e., the application of the neural network to image A and y: represents the image B.

For noisy images, the noise of which can be described using a mean value, an L2 norm having the relationship of the variables as reflected by formula 2 can be used for the computation of the parameters of the neural network.

$$L2 = \frac{1}{n}\sum_{i=1}^{n}\left(\hat{y}^{(i)} - y^{(i)}\right)^2 \quad (2)$$

Figure 2:
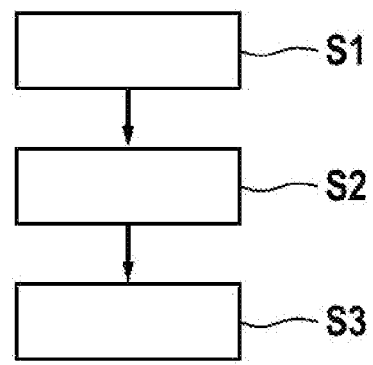
FIG. 2 shows a method for correcting noisy image components.

FIG. 2 shows a method for generating a digital image pair for training a neural network to correct noisy image components of noisy images.

In this case, in a step S1, an extent is determined of object movements within an overlapping region of a stored first digital image and a stored second digital image of an environment of a mobile platform.

In a further step S2, respective acquired solid angles of the environment of the mobile platform, of the first and second digital image are determined.

In a further step S3, a digital image pair is generated from the first digital image and the second digital image if the respective acquired solid, of the environment of the first and the second digital image do not differ from one another by more than a defined difference, and the extent of the object movements within the overlapping region of the first and the second digital image is less than a defined value.

What is claimed is:

1. A method for generating a digital image pair for training a neural network to correct noisy image components of noisy images, the method comprising:
    determining an extent of object movements within an overlapping region of a stored first digital image and a stored second digital image of an environment of a mobile platform;
    determining a respective acquired solid angle of the environment of the mobile platform of each of the stored first digital image and the stored second digital image; and
    generating the digital image pair from the stored first digital image and the stored second digital image in response to (i) a difference between the respective acquired solid angles of the store first digital image and the stored second digital image being less than a defined difference, and (ii) the extent of the object movements within the overlapping region of the stored first digital image and the stored second digital image being less than a defined value.

2. The method according to claim 1, further comprising:
determining the extent of the object movements within the overlapping region of the stored first digital image and the stored second digital image using data of an inertial navigation system of the mobile platform.

3. The method according to claim 1, further comprising:
determining the respective acquired solid angles of the stored first digital image and the stored second digital image using data of an inertial navigation system of the mobile platform.

4. The method according to claim 1, further comprising:
ascertaining the extent of the object movement based on at least one of (i) a signal of a radar sensor, (ii) an image analysis of an optical system, and (iii) a tracking system.

5. The method according to claim 1, further comprising:
determining the difference between the respective acquired solid angles of the stored first digital image and the stored second digital image using data of at least one inertial sensor of the mobile platform.

6. The method according to claim 1, further comprising:
generating the stored first digital image and the stored second digital image by a transformation of signals of a LIDAR system.

7. The method according to claim 1, further comprising:
acquiring the stored first digital image and the stored second digital image based on image-generating systems of a plurality of at least partially automated mobile platforms.

8. A method for training a neural network to correct noisy image components of noisy images, the method comprising:
    generating a digital image pair by:
        determining an extent of object movements within an overlapping region of a stored first digital image and a stored second digital image of an environment of a mobile platform;
        determining a respective acquired solid angle of the environment of the mobile platform of each of the stored first digital image and the stored second digital image; and
        generating the digital image pair from the stored first digital image and the stored second digital image in response to (i) a difference between the respective acquired solid angles of the store first digital image and the stored second digital image being less than a defined difference, and (ii) the extent of the object movements within the overlapping region of the stored first digital image and the stored second digital image being less than a defined value; and
    training the neural network to generate the stored second digital image of the digital image pair using the stored first digital image of the digital image pair as an input variable.

9. The method according to claim 8, further comprising:
using the trained neural network for correcting noisy image components of noisy images by
    transferring a noisy image as an input variable to the trained neural network, and
    correcting the noisy image components in the image generated by the neural network.

10. The method according to claim 9, further comprising:
generating a representation of the environment of the mobile platform based on images which have been acquired by image-generating systems from the environment of the mobile platform and the corrected noisy image components,
wherein the mobile platform is at least partially automated.

11. The method according to claim 10, further comprising:
using the representation of the environment to at least one of (i) activate an at least partially automated vehicle and (ii) transmit a depiction of the representation to a vehicle occupant.

12. The method according to claim 8, wherein a computer program product comprises commands which, upon the execution of the computer program product by a computer, causes the computer to execute the method.

13. The method according to claim 12, wherein the computer program product is stored on a machine-readable storage medium.

* * * * *